United States Patent Office 3,488,285
Patented Jan. 6, 1970

3,488,285
ALKENYL SUCCINIC ACID-AZIRIDINYL PHOSPHINE CHALCOGENIDE ADDUCTS, METHOD OF PREPARATION AND LUBRICANT COMPOSITIONS THEREOF
Walter W. Hellmuth and Frederic C. McCoy, Beacon, and Edwin C. Knowles, Poughkeepsie, N.Y., assignors to Texaco Inc., New York, N.Y., a corporation of Delaware
No Drawing. Filed Mar. 16, 1967, Ser. No. 623,544
Int. Cl. C10m 1/44; C07f 9/02
U.S. Cl. 252—46.7                    11 Claims

ABSTRACT OF THE DISCLOSURE

An alkenyl succinic acid-aziridinyl phosphine chalcogenide lubricating oil dispersant prepared by contacting alkenyl succinic acid of the formula:

$$\begin{array}{c} R-CH-COOH \\ | \\ CH_2-COOH \end{array}$$

where R is a monovalent alkenyl hydrocarbon radical of from 30 to 200 carbons with an aziridinyl phosphine chalcogenide of the formula:

$$\begin{array}{c} R'-CH \quad Z \\ \diagdown \quad | \\ N-P=X \\ \diagup \quad | \\ CH_2 \quad N \\ \diagup \diagdown \\ R'-CH \quad CH_2 \end{array}$$

where X is oxygen or sulfur, R' is hydrogen or a monovalent saturated aliphatic hydrocarbon radical (alkyl) of from 1 to 30 carbons, Z is $$-N\diagup\begin{array}{c}CH_2\\ \\ CH-R'\end{array}$$

or alkyl, alkoxy, aryl or haloaryl of from 1 to 30 carbons. Additional lube oil dispersant derivatives of alkenyl succinic acid-aziridinyl phosphine chalcogenide adducts are prepared by contacting alkenyl succinic acid-aziridinyl phosphine chalcogenide adduct with an end stopping member selected from the group consisting of alkanoic acid of the formula: $R^2COOH$, alkylene polyamine of the formula $H_2N(ANH)_bH$, and alkoxylated piperazine of the formula:

$$HO-E-N\diagup\begin{array}{c}CH_2CH_2\\ \\ CH_2CH_2\end{array}\diagdown N-D-N\diagup\begin{array}{c}E-OH\\ \\ E-OH\end{array}$$

where $R^2$ is alkyl of from 1 to 20 carbons, A is divalent saturated aliphatic hydrocarbon (alkanediyl) of from 2 to 6 carbons, b is an integer from 1 to 6 and E and D are alkanediyl of from 2 to 6 carbons. Still further, the disclosure encompasses oil compositions containing between about 0.1 and 80 wt. percent of said adduct and/or said adduct derivative.

BACKGROUND OF INVENTION

Field of invention

The field of art to which this invention pertains is organic esters of phosphorus acid and non-esters which contain at least one phorphorus to nitrogen bond. The field of art also encompasses fluid compositions containing said esters and non-esters designed for use between two relatively moving surfaces in contact therewith for reducing friction therebetween.

Description of prior art

Lubricating oils in engine operations are subjected to considerable contamination from combustion products which result in the formation of sludge and other deposits in the crankcase and on many moving parts of the engine. It is, therefore, desirable to have a lubricating oil containing some oil surface active agent which will act as a dispersant in the oil and prevent sludge formation and promote engine cleanliness. The prior art teaches an extensive number of dispersants for lubricating oil compositions. For example U.S. 3,172,892 discloses as a dispersant the reaction product of an alkenyl succinic acid anhydride and an alkylene polyamine. U.S. 3,143,506 discloses amine salts of hydrocarbyl thiophosphonic acid as lubricating oil detergent-dispersant. Although many of the phosphorus and nitrogen containing dispersants known to the prior art function satisfactorily as dispersants, an increasing number are proving unsatisfactory due to the demands placed on the lubricating oil by modern day high speed engines and pollution control devices. The novel adduct and adduct derivatives of the invention combine the attributes of the individual phosphorus and nitrogen containing dispersants in a single adduct and permit the lubricating oils to meet the demands of modern day engines and anti-pollution devices in respect to dispersancy.

SUMMARY OF INVENTION

The invention pertains to novel alkenyl succinic acid-aziridinyl phosphine chalcogenide adducts and derivatives thereof having dispersant properties in lubricating oils. The novel adduct is prepared by contacting an alkenyl succinic acid of the formula:

$$\begin{array}{c} R-CH-COOH \\ | \\ CH_2-COOH \end{array}$$

where R is a monovalent alkenyl hydrocarbon radical of from 30 to 200 carbons with an aziridinyl phosphine chalcogenide of the formula:

$$\begin{array}{c} R'-CH \quad Z \\ \diagdown \quad | \\ N-P=X \\ \diagup \quad | \\ CH_2 \quad N \\ \diagup \diagdown \\ R'-CH \quad CH_2 \end{array}$$

where X is oxygen or sulfur, R' is hydrogen or alkyl of from 1 to 30 carbons, Z is $$-N\diagup\begin{array}{c}CH_2\\ \\ CH-R'\end{array}$$

or alkyl, alkoxy, aryl or haloaryl from 1 to 3 carbons to form the alkenyl succinic acid-aziridinyl phosphine chalcogenide adduct, and then optionally if excess unreacted aziridinyl groups are present, contacting said adduct with an end stopping member selected from the group consisting of alkanoic acid of the formula $R^2COOH$, alkylene polyamine of the formula $H_2N(ANH)_bH$ and an alkoxylated piperazine of the formula:

$$HO-E-N\diagup\begin{array}{c}CH_2CH_2\\ \\ CH_2CH_2\end{array}\diagdown N-D-N\diagup\begin{array}{c}E-OH\\ \\ E-OH\end{array}$$

where $R^2$ is alkyl of from 1 to 20 carbons, A is an alkanediyl of from 2 to 6 carbons, b is an integer of from 1 to 6, and E and D are alkanediyl of from 2 to 6 carbons to form the adduct derivative. The adduct and adduct derivative are in essence a mixture of monomeric and polymeric compounds. The invention further pertains to the preparation of hydrocarbon lubricating oil compositions containing between about 0.1 and 80 wt. percent of said adduct or adduct derivative.

DETAILED DESCRIPTION OF THE INVENTION

Adduct and preparation

Specifically, as one embodiment of the invention, the novel alkenyl succinic acid-aziridinyl phosphine chalcogenide adduct is prepared by contacting alkenyl succinic acid as heretofore defined with aziridinyl phosphine chalcogenide as heretofore defined, advantageously at a temperature between 20 and 160° C. for a period of between about 2 and 24 hours in a ratio of carboxyl to aziridinyl groups in the initial reaction mixture of between about 2:1 and 1:3. The contacting advantageously is conducted in the presence of a hydrocarbon lubricating oil and/or volatile inert organic diluent to facilitate the reactant contact and in the case of the hydrocarbon lubricating oil diluent additionally to promote incorporation of the product in finished lubricating oil compositions. The diluent normally constitutes between about 10 and 75 wt. percent of the reaction mass while the hydrocarbon oil diluent normally constitutes between about 5 and 50 wt. percent. To further facilitate contact the reaction mixture is desirably maintained in a state of agitation such as through the utilization of any standard stirring techniques. At the end of the reaction the volatile diluent is removed by standard means such as distillation at atmospheric or reduced pressure together with or without the aid of an inert stripping gas such as nitrogen. If hydrocarbon lubricating oil is employed in the reaction, it will remain as part of the final product forming a lubricating oil concentrate thereof and also part of the lubricant composition if the adduct is so used. After removal of the volatile diluent (if employed) the formed adduct or its lubricating oil concentrate remains as residue. As heretofore described, it is a mixture of monomers and polymers. The adduct mixture is so complex as to defy an accurate description of all the individual compounds therein. However, it is theorized some of the principal constituents of the adduct mixture are as follows:

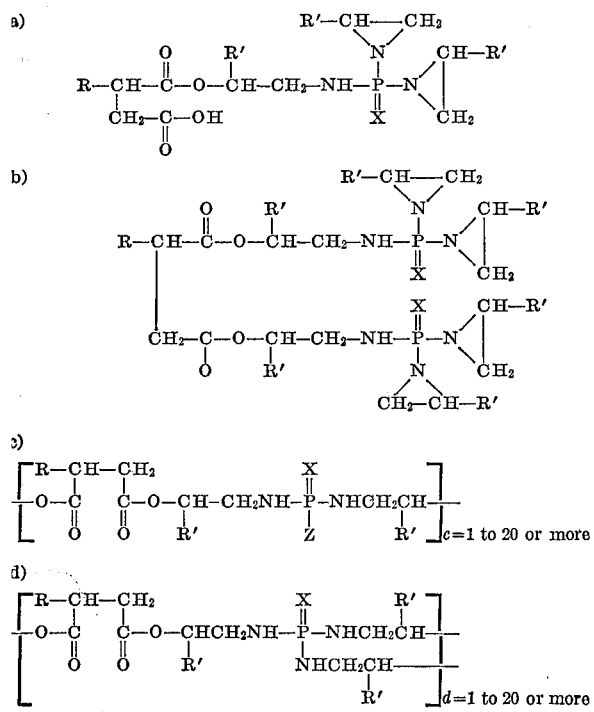

where R, R', X and Z are as heretofore defined. Further, it is theorized the adduct mixture also contains derivatives of aziridinyl phosphine chalcogenide homopolymers and the succinic acid reactant, decomposition products of the aforementioned adducts, (thio)phosphoramide and (thio)phosphoric acid derivatives, and cyclization reaction products of the primary adducts.

Adduct derivatives and preparation

Another embodiment of the invention relates to dispersant derivatives of said aforedescribed alkenyl succinic acid-aziridinyl adduct. The derivatives are prepared by contacting said aforedescribed adduct with an end-stopping member selected from the group consisting of alkanoic acid, alkylene polyamine and alkoxylated piperazine as heretofore defined at a temperature between about 60 to 180° C., preferably for a period of time, e.g., between about 1 and 24 hours, utilizing a reactant ratio of between about 5:1 and 1:5 moles of said member per aziridinyl group calculated present in said adduct in excess of the carboxyl groups therein. As heretofore stated, the derivative adduct is formed when, in the formation of the adduct, quantities were employed resulting in an excess of aziridinyl groups in the reaction mixture in respect to carboxyl groups therein.

In the formation of the adduct derivative, hydrocarbon lubricating oil and volatile inert liquid diluent may be employed of the type and in the quantities utilized in the formation of the adduct precursor to facilitate reactant contact and incorporation of the adduct in finished lube oil compositions. If desired the volatile diluent as well as the hydrocarbon oil may be carried over from the reaction preparing the non-end-stopped succinic acid-aziridinyl adduct. As in the case of the adduct, if hydrocarbon lubricating oil is present, it becomes part of the final product and part of the lubricating composition formed therefrom. To further facilitate contact of reactants the reaction mixture is preferably maintained in an agitated state.

In the preparation of the adduct derivative when an alkylene polyamine is the end-stopping member, acid catalyst is preferably employed in an amount of between about .01 and 5 wt. percent of the reaction mixture.

At the close of the reaction the volatile diluent (if employed) is removed by standard means such as atmospheric or vacuum distillation alternatively with a concurrent stripping of the reaction mixture with an inert gas such as nitrogen leaving the adduct derivative or lube oil concentrate thereof. As heretofore stated, the adduct derivative is in essence a complex mixture of monomeric and polymeric compounds which defy ready description in terms of nomenclature or formula. Some of the main constituents of the derivative adduct are theorized to be of the following formulas:

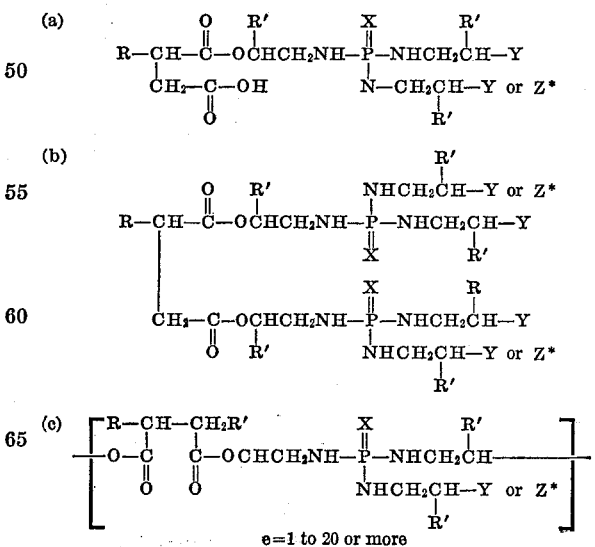

where R, R', Z* is Z excluding

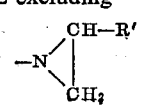

and Y is a monovalent residue of the end-stopping member, i.e., Y is —OOCR$^2$, NH$_2$(ANH)$_b$ or

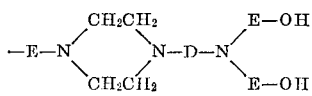

where R$^2$, X, A, E, b, and D are as heretofore defined.

Lube oil composition

In the preparation of the lubricating oil compositions containing the adduct and adduct derivative dispersants any of the paraffinic, naphthenic and aromatic base lubricating oil derived from petroleum crudes are suitable. Further, synthetic hydrocarbon lubricating oils are also suitable such as the liquid polyalkenes of a molecular weight between about 250 and 2500, e.g., polyisopropylene (900 m.w.) and polyisobutene (1200 m.w.). Lubricating oils having an SUS viscosity at 100° F. of between about 45 and 7500 are particularly suitable as base oil materials. In addition to the adduct and adduct derivative dispersants of the invention the lubricating oil compositions contemplated herein can obtain other additives such as the known antioxidants, VI improvers, pour depressants and dispersants. The particular additive combination employed in the finished lubricating oil compositions will of course be determined by the specific use designated for the finished lubricating oil. Normally, in finished lubricating oils the dispersant content of adduct or adduct derivative will range between about 0.1 and 10 wt. percent. However, even in concentrate amounts, e.g., 10 to up to about 80%, the adduct and adduct derivatives of the invention will still function as dispersants.

General description

Specific examples of alkenyl succinic acids contemplated herein are where the alkenyl group therein is derived from a polyalkene which in turn is derived from polymerization of alkene monomers of from 2 to 5 carbons such as ethylene, propylene, 1-isobutylene and 2-pentylene resulting in the formation of polyethylene, polypropylene, polyisobutylene and polypentylene. Particularly suitable polyalkenes from which alkenyl succinic acid is formed are the polyisobutylenes of an average molecular weight of between about 1000 and 2000. One particularly suitable alkenyl succinic acid is polyisobutene (1200 m.w.) succinic acid of the formula:

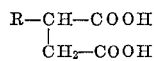

where R is a monovalent polyisobutene radical of about 1200 molecular weight.

Specific examples of the aziridinyl phosphine chalcogenides contemplated herein are tris-1-(2-methylaziridinyl) phosphine oxide,
tridecoxydiaziridinyl phosphine oxide,
ethoxydiaziridinyl phosphine oxide,
triaziridinyl phosphine oxide,
tris-1-(2-propylaziridinyl) phosphine oxide,
phenyl bis-1-(2-methylaziridinyl) phosphine oxide,
p-bromophenyldiaziridinyl phosphine oxide,
tris-1-(2-methylaziridinyl) phosphine sulfide,
triaziridinyl phosphine sulfide, and
hexoxydiaziridinyl phosphine sulfide.

Specific examples of the end-stopping reactants utilized in the preparation of the adduct derivatives contemplated herein are ethylenediamine, diethylenetriamine, tetraethylene pentamine, tripropoxylated N-aminoethylpiperazine of the formula:

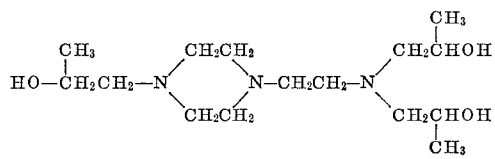

acetic acid, pentanoic acid, butanoic acid and decanoic acid.

Examples of the volatile inert liquid diluents contemplated herein are any of the aromatic liquid hydrocarbons of a boiling point between about 80 and 160° C. such as benzene, toluene and xylene.

Examples of acid catalyst utilized in the adduct derivative when an alkylene polyamine is employed as the end-stopping agent are the inorganic acid salts such as NH$_4$Cl, ZnCl$_2$ and AlBr$_3$.

If lubricating oil is employed as diluent any of the aforementioned lubricating oils in respect to the lubricant compositions will be suitable. However, a particularly desirable base oil is the polyalkene from which the alkenyl group in the alkenyl succinic acid is derived.

Examples

The following examples further illustrate the products, method and compositions of the invention but are not to be interpreted as limitations thereof:

*Example I.*—To a 1 liter flask fitted with stirrer, dropping funnel, thermocouple and trap, there was charged 120 g. of polyisobutene (1200 m.w.) succinic anhydride, 51 g. polyisobutene oil (1200 m.w. associated with the succinic anhydride), 100 mls. of isooctane and 100 mls. water. The reaction mixture was heated to and maintained at reflux for 1 hour to convert the anhydride to the corresponding polyisobutene (1200 m.w.) succinic acid. The mixture was then cooled to 70° C. and 32.0 g. of tridecoxydiaziridinyl phosphine oxide were added dropwise over 2 hours at this temperature. The reaction mixture was then heated to reflux and all water removed azeotropically for 4 hours whereupon temperature was then raised to 150° C. and vacuum applied (0.5 mm. Hg) to remove the isooctane diluent and any traces of water. The resultant residue is a yellow-brown colored viscous polyisobutene lube oil concentrate composition containing 75 wt. percent of polyisobutene (1200 m.w.) succinic acid-tridecoxydiaziridinyl phosphine oxide adduct. Average molecular weight of the diluted additive determined by osmometer in benzene was 2182. Additional analysis and characterization of the concentrate found the following:

| Description: | Result |
|---|---|
| Nitrogen, wt. percent: | |
| Found | 1.3 |
| Calculated | 1.4 |
| Phosphorus, wt. percent: | |
| Found | 2.0 |
| Calculated | 1.5 |

*Example II.*—To a 1 liter reactor as described in Example I there was charged 120 g. polyisobutene (1200 m.w.) succinic anhydride, 145 g. polyisobutene oil (1200 m.w. associated with said succinic anhydride), 129 g. paraffin mineral oil of 99 SUS viscosity at 100° F., 20 mls. water and 100 mls. benzene. In order to convert the anhydride to its corresponding succinic acid form, the mixture was heated at reflux for 0.5 hour then excess water was removed azeotropically. Ethoxydiaziridinyl phosphine oxide (17.6 g.) was then added dropwise over 0.5 hour to give a 1:1 ratio of carboxyl to aziridinyl groups in the reaction mixture. The resultant reaction mixture was heated to and maintained at a temperature of 130° C. for a period of 3 hours. At the end of the 3 hour period the temperature was raised to remove the volatile diluent and the residue was filtered leaving a brown colored viscous lubricating oil concentrate containing 33 wt. percent of an adduct of polyisobutene (1200 n.w.) succinic acid and ethoxydiaziridinyl phosphine oxide. Analysis of the concentrate found the following:

| Description: | Result |
|---|---|
| Nitrogen, wt. percent: | |
| Found | 0.70 |
| Calculated | 0.75 |
| Phosphorus, wt. percent: | |
| Found | 0.68 |
| Calculated | 0.68 |

*Example III.*—To a 1 liter reactor described in Example I there was charged 177 grams of paraffin mineral oil of 99 SUS viscosity at 100° F., 120 grams polyisobutene (1200 m.w.) succinic anhydride, 149 grams polyisobutene oil (1200 m.w. associated with the succinic anhydride reactant), 150 mls. of volatile isooctane diluent and 100 mls. water. The anhydride was converted to its corresponding succinic acid form by heating the resultant mixture at reflux (97° C.) for 2 hours and then removing the excess water azeotropically over 3 hours. The reaction mixture was cooled to 45° C. and 23.5 g. tris-1-(2-methylaziridinyl) phosphine oxide added dropwise over ¼ hour at 45° C. to give a carboxyl group to aziridinyl group ratio of 2:3. The stirrer was actuated and the reaction mixture was heated to and maintained at 160° C. for a period of 18 hours. At the end of the 18 hour period vacuum was applied (0.4 mm. Hg) at 160° C. to remove volatile isooctane diluent. The residue was filtered leaving a brown colored viscous polyisobutene oil concentrate containing 30 wt. percent of the adduct of polyisobutene (1200 m.w.) succinic acid and tris-1-(2-methylaziridinyl) phosphine oxide. The adduct containing lubricant oil concentrate gave the following analysis:

| Description: | Result |
|---|---|
| Nitrogen, wt. percent: | |
| Found | 0.90 |
| Calculated | 0.90 |
| Phosphorus, wt. percent: | |
| Found | 0.61 |
| Calculated | 0.68 |

*Example IV.*—To a 1 liter flask of the type described in Example I there was charged 122 grams of paraffin mineral oil of an SUS viscosity at 99 at 100° F., 120 grams polyisobutene (1200 m.w.) succinic anhydride, 144 grams polyisobutene oil (1200 m.w. associated with the succinic anhydride), 150 mls. of volatile isooctane diluent and 100 mls. of water. The anhydride was converted to its corresponding succinic acid by heating the resultant mixture at reflux for 2 hours and then removing the excess water azeotropically. To the polybutene succinic acid containing residue 21.5 grams of tris-1-(2-methylaziridinyl) phosphine oxide were added dropwise (carboxyl group to aziridinyl group ratio of 2:3) followed by the addition of 100 mls. of isooctane. The resultant mixture was heated to and maintained at reflux temperature for a period of 2 hours whereupon 10.3 grams of diethylenetriamine and 0.1 gram of p-toluene sulfuric acid were added to the reaction mixture and the resultant mixture was refluxed for an additional 2 hour period. At the end of the additional 2 hour period the temperature was raised to 160° C. to remove the volatile isooctane diluent and any volatile reactants and product leaving a polyisobutene lubricating oil concentrate containing 36 wt. percent of the diethylenetriamine derivative of the polyisobutene (1200 m.w.) succinic acid-tris-1-(2-methylaziridinyl) phosphine oxide adduct. The analysis of the lube oil concentrate found the following:

| Description: | Result |
|---|---|
| Nitrogen, wt. percent: | |
| Found | 1.5 |
| Calculated | 2.0 |
| Phosphorus, wt. percent: | |
| Found | 0.61 |
| Calculated | 0.74 |

*Example V.*—To a 1 liter flask of the type described in Example I there was charged 102 grams paraffin mineral oil of 100 SUS viscosity at 100° F., 120 grams polyisobutene (1200 m.w.) succinic anhydride, 144 grams polyisobutene oil (1200 m.w. associated with the succinic anhydride reactant), 150 mls. volatile isooctane diluent and 100 mls. water. The reaction mixture was heated at reflux (120° C.) for 2 hours, and the excess water then removed azeotropically to afford a solution containing the polyisobutene (1200 m.w.) succinic acid converted from the corresponding anhydride. Tris-1-(2-methylaziridinyl) phosphine oxide in an amount of 21.5 g. was added to said solution dropwise to give a carboxyl to aziridinyl mole ratio of 2:3 and the resultant mixture was heated at reflux an additional 2 hours. Then 20.3 grams of tripropoxylated N-aminoethyl piperazine of the formula:

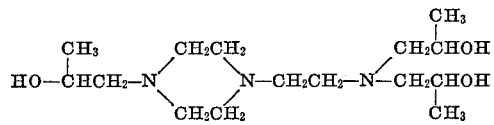

along with 0.1 g. p-toluenesulfonic acid were added to the reaction mixture and the resultant mixture was heated at reflux for a 2 hour period. At the end of the 2 hour period the temperature was raised to 160° C. to remove the isooctane diluent and any volatile reactants or products leaving a red-brown colored viscous polyisobutene oil concentrate containing 41 wt. percent of a tripropoxylated N-aminoethyl piperazine end-stopped derivative of the polyisobutene (1200 m.w.) succinic acid-tris-1-2-methylaziridinyl) phosphine oxide adduct. An analysis of the concentrate found the following:

| Description: | Result |
|---|---|
| Nitrogen, wt. percent: | |
| Found | 1.8 |
| Calculated | 2.0 |
| Phosphorus, wt. percent: | |
| Found | 0.64 |
| Calculated | 0.74 |

*Example VI.*—To a 2 liter flask of the type described in Example I there was charged 2.0 grams of water, 240 grams polyisobutene (1200 m.w.) succinic anhydride, 288 grams polyisobutene oil (1200 m.w. associated with succinic anhydride reactant) and 500 mls. of volatile isooctane diluent. The mixture was stirred 0.5 hour at room temperature thereby converting the succinic anhydride to the corresponding succinic acid. To the stirred mixture there was then added over 0.5 hour period 21.5 grams of tris-1-(2-methylaziridinyl) phosphine oxide in 200 mls. of isooctane. The reaction mixture containing a carboxyl to aziridinyl mole ratio of 2:3 was then heated to and maintained at reflux temperature for a period of 1 hour whereupon 12.0 grams of acetic acid were charged to the reaction mixture and the reaction temperature was maintained at reflux for an additional period of 3 hours. At the end of the 3 hour additional period the temperature was raised to 150° C. under 0.5 mm. Hg to remove the isooctane diluent and any volatile reactants or products. Filtration gave a dark amber colored viscous polyisobutene lube oil concentrate filtrate containing 49 wt. percent of the acetic acid end-stopped derivative of the polyisobutene (1200 m.w.) succinic acid-tri-1-(2-methylaziridinyl) phosphine oxide adduct. The residual concentrate gave the following analysis:

| Description: | Result |
|---|---|
| Nitrogen, wt. percent: | |
| Found | 0.65 |
| Calculated | 0.75 |
| Phosphorus, wt. percent: | |
| Found | 0.35 |
| Calculated | 0.55 |
| Kin. visc., at 100° F. cs. | 10,206 |

*Example VII.*—This example illustrates finished lube oil compositions containing the adducts prepared and described in Examples I–VI and further displays their dispersant properties.

To determine the dispersancy effectiveness of the novel adduct and adduct derivative of the invention, lubricant compositions were subjected to a bench sludge test and some of the compositions were further tested in an automotive type engine test. The test procedures are as follows:

*Sludge test.*—The procedure comprises introducing into a bottle the test oil composition, titanium oxide (6 wt. percent) in oil, and engine blowby. The bottle is agitated at an elevated temperature for a period of time and a portion of the bottle contents is then centrifuged. Upon centrifuging the acid portion separates into three phases, i.e., a top clear oil phase, a middle dirty oil phase in which sludge remains dispersed and a bottom sediment phase. The clear oil and sediment depth are measured in millimeters and recorded for this, the first cycle. For the second and subsequent cycles, to the sample remaining in the bottle from the first cycle titanium oxide (6 wt. percent) in oil and engine blowby are added, and the procedure of the first cycle is repeated. The greater the depth of sediment and clear oil in the centrifuged tube the less the dispersant capacity of the test oil composition.

*Engine test.*—The engine test procedure comprises lubricating with the test oil composition a single cylinder engine operated at an r.p.m. of 1500 with alternating cooling jacket temperatures of 6 hours at 110 and 2 hours at 190° F. The rocker arm area, push rod area, timing gear area, oil pan crankcase and oil screen are periodically inspected for sludge and rated from 10 to 0. A rating of 10 represents a clean, no sludge rating and a rating of 0 represents a heavy sludge deposit. The rating scales are based on the Coordinating Research Council scales adopted January 1955.

The base oil composition employed in the test oil compositions was a dewaxed refined paraffinic petroleum lubricating oil having an SUS viscosity at 100° F. of about 250 containing an additive mixture of about 1.8 wt. percent barium $C_{12}$ alkylphenolate, 0.87 wt. percent zinc isopropyl 1,3-dimethylbutyl dithiophosphate, 0.57 wt. percent $CO_2$ neutralized basic barium sulfonate, 4 wt. percent mineral oil concentrate containing 25 wt. percent of a copolymer of mixed methacrylate alkyl esters in which the alkyl groups range from butyl to octadecyl, and 150 p.p.m. silicon antifoam concentrate. The concentrate products of Examples I–VI were incorporated in the basis oil composition to form a final composition containing from 2.6 to 3.6 wt. percent concentrate in the base oil. The test data and results are reported below in Tables I and II:

We claim:
1. A lubricating oil composition comprising a lubricating amount of hydrocarbon lubricating oil and between about 0.1 and 80 wt. percent of said composition of a dispersant adduct prepared by first reacting a succinic acid of the formula:

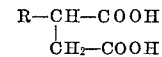

where R is a monovalent alkenyl hydrocarbon radical of from 30 to 200 carbons, with an aziridinyl phosphine chalcogenide of the formula:

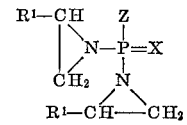

where X is oxyen or sulfur, $R^1$ is hydrogen or alkyl of from 1 to 30 carbons, Z is

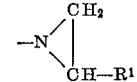

or alkyl, alkoxy, aryl or haloaryl of from 1 to 30 carbons at a temperature between about 80 and 160° C. utilizing initial reactant quantities wherein the mole ratio of carboxyl to aziridinyl groups is between about 2:1 and 1:3.

2. A lubricating oil composition in accordance with claim 1 wherein said first reacting is conducted in the presence of a volatile inert liquid diluent and subsequent to said first reacting said volatile diluent is separated from said reaction mixture.

3. A lubricating oil composition in accordance with claim 1 wherein said adduct is second reacted with an end-stopping member selected from the group consisting of an alkanoic acid of from 2 to 21 carbons, an alkylene polyamine of the formula $H_2N(ANH)_bH$ and an alkoxylated piperazine of the formula:

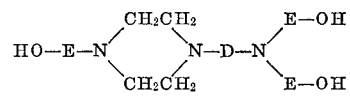

where A, E and D are alkanediyls of from 2 to 6 carbons and $b$ is an integer of from 2 to 6 at a temperature of between about 60 and 180° C. utilizing a reactant mole ratio of between about 5:1 and 1:5 moles of said end-stopping member to aziridinyl group based on moles of aziridinyl group in excess of carboxyl group in said first contacting.

4. A lubricating oil composition in accordance with claim 3 wherein said first reacting is conducted in the presence of a volatile inert liquid diluent and said diluent is removed at the termination of the second reacting.

5. A lubricating oil composition in accordance with claim 4 wherein the second reacting is conducted in the presence of an acid catalyst.

6. A lubricating oil composition in accordance with claim 2 wherein said R is a polyisobutene radical of a molecular weight of about 1200 and said aziridinyl phos-

TABLE I.—SLUDGE TEST

| Run | Lube concentrate | Concentrate in test comp., wt. percent | Cycles (depth in mm.) | | | | | | |
|---|---|---|---|---|---|---|---|---|---|
| | | | 1 | 2 | 3 | 4 | 5 | 6 | |
| 1 | Ex. I | 2.6 | 1 | 2 | 4 | 32 | | | Clear. |
| | | | 0.5 | 1 | 6 | 12 | | | Sediment. |
| 2 | Ex. II | 3.6 | 1 | 2 | 11 | 30 | | | Clear. |
| | | | 0.5 | 2 | 4.8 | 11 | | | Sediment. |
| 3 | Ex. III | 3.6 | 1 | 1 | 8 | 15 | 23 | 26 | Clear. |
| | | | 0.5 | 1 | 3.5 | 4.5 | 7 | 9 | Sediment. |
| 4 | Ex. IV | 3.6 | 1 | 2 | 15 | 28 | | | Clear. |
| | | | 0.75 | 3 | 7.5 | 10 | | | Sediment. |
| 5 | Ex. V | 3.6 | 1 | 2 | 8 | 24 | 35 | | Clear. |
| | | | 0.5 | 1 | 6 | 11 | 15 | | Sediment. |
| 6 | Ex. VI | 3.3 | 1 | 1 | 3 | 25 | 33 | 33 | Clear. |
| | | | 1 | 1 | 4 | 10.5 | 15 | 14 | Sediment. |

TABLE II.—ENGINE TEST

| Run | Lube concentrate | Concentrate in test comp., wt. percent | Hours to sludge rate of 8.0 |
|---|---|---|---|
| 3 | Ex. III | 3.6 | 80 |
| 4 | Ex. IV | 3.6 | 81 |
| 5 | Ex. V | 3.6 | 112 |
| Control | None | 0 | <04 | phine chalcogenide is tridecyldiaziridinyl phosphine oxide.

7. A lubricating oil composition in accordance with claim 2 wherein said R is a polyisobutene radical of a molecular weight of about 1200 and said aziridinyl phosphine chalcogenide is ethoxydiaziridinyl phosphine sulfide.

8. A lubricating oil composition in accordance with claim 2 wherein R is a polyisobutene radical of 1200 molecular weight and said aziridinyl phosphine chalcogenide is tris-1-(2-methylaziridinyl)phosphine oxide.

9. A lubricating oil composition in accordance with claim 5 wherein said R is polyisobutene of a molecular weight of about 1200, said aziridinyl phosphine chalcogenide is tris-1-(2-methylaziridinyl)phosphine oxide, and said end-stopping member is diethylenetriamine.

10. A lubricating oil composition in accordance with claim 5 wherein R is polyisobutene of a molecular weight of about 1200, said aziridinyl phosphine chalcogenide is tris - 1-(2-methylaziridinyl)phosphine oxide, said end-stopping reagent is tripropoxylated N-aminoethylpiperazine of the formula:

$$HO-\overset{CH_3}{\underset{|}{C}}HCH_2-N\overset{CH_2CH_2}{\underset{CH_2CH_2}{\diagup\diagdown}}N-CH_2CH_2-N\overset{CH_2-\overset{CH_3}{\underset{|}{C}}H-OH}{\underset{CH_2-\overset{|}{C}H-OH}{\diagup\diagdown}}\underset{CH_3}{}$$

11. A lubricating oil composition in accordance with claim 5 wherein R is a monovalent polyisobutene radical of a molecular weight of about 1200, said aziridinyl phosphine oxide is tris-1-(2-methylaziridinyl)phosphine oxide, and said end-stopping member is acetic acid.

12. An adduct prepared by first reacting a succinic acid of the formula:

$$R-CH-COOH$$
$$\underset{|}{CH_2-COOH}$$

where R is a monovalent alkenyl hydrocarbon radical of from 30 to 200 carbons, with an aziridinyl phosphine chalcogenide of the formula:

$$\begin{array}{c} R^1-CH \quad Z \\ | \quad \diagdown \| \\ N-P=X \\ CH_2 \quad N \\ \diagup \diagdown \\ R^1-CH \longrightarrow CH_2 \end{array}$$

where X is oxygen or sulfur, R¹ is hydrogen or alkyl of from 1 to 30 carbons, Z is $$-N\overset{CH_2}{\underset{CH-R^1}{\diagup\diagdown}}$$

or alkyl, alkoxy, aryl or haloaryl of from 1 to 30 carbons at a temperature between about 80 and 160° C. utilizing initial reactant quantities wherein the mole ratio of carboxyl to aziridinyl groups is between about 2:1 and 1:3.

13. An adduct in accordance with claim 12 wherein said first reacting is conducted in the presence of a volatile inert liquid diluent and subsequent to said first reacting said volatile diluent is separated from said reaction mixture.

14. An adduct in accordance with claim 12 wherein said adduct is second reacted with an end-stopping member selected from the group consisting of an alkanoic acid of from 2 to 21 carbons, an alkylene polyamine of the formula $H_2N(ANH)_bH$ and an alkoxylated piperazine of the formula:

$$HO-E-N\overset{CH_2CH_2}{\underset{CH_2CH_2}{\diagup\diagdown}}N-D-N\overset{E-OH}{\underset{E-OH}{\diagup\diagdown}}$$

where A, E and D are alkanediyls of from 2 to 6 carbons and b is an integer of from 2 to 6 at a temperature of between about 60 and 180° C. utilizing a reactant mole ratio of between about 5:1 and 1:5 moles of said end-stopping member to aziridinyl group based on moles of aziridinyl group in excess of carboxyl group in said first contacting.

15. An adduct in accordance with claim 14 wherein said first reacting is conducted in the presence of a volatile inert liquid diluent and said diluent is removed at the termination of the second reacting.

16. An adduct in accordance with claim 15 wherein the second reacting is conducted in the presence of an acid catalyst.

17. An adduct in accordance with claim 13 wherein said R is a polybutene radical of a molecular weight of about 1200 and said aziridinyl phosphine chalcogenide is tridecyldiaziridinyl phosphine oxide.

18. An adduct in accordance with claim 13 wherein said R is a polyisobutene radical of a molecular weight of about 1200 and said aziridinyl phosphine chalcogenide is ethoxydiaziridinyl phosphine sulfide.

19. An adduct in accordance with claim 13 wherein R is a polyisobutene radical of 1200 molecular weight and said aziridinyl phosphine chalcogenide is tris-1-(2-methylaziridinyl) phosphine oxide.

20. An adduct in accordance with claim 16 wherein said R is polyisobutene of a molecular weight of about 1200, said aziridinyl phosphine chalcogenide is tris-1-(2-methylaziridinyl) phosphine oxide, and said end-stopping member is diethylenetriamine.

21. An adduct in accordance with claim 16 wherein R is polyisobutene of a molecular weight of about 1200, said arizidinyl phosphine chalcogenide is tris-1-(2-methylaziridinyl) phosphine oxide, said end-stopping reagent is tripropoxylated N-aminoethylpiperazine of the formula:

$$HO-\overset{CH_3}{\underset{|}{C}}HCH_2-N\overset{CH_2CH_2}{\underset{CH_2CH_2}{\diagup\diagdown}}N-CH_2CH_2-N\overset{CH_2-\overset{CH_3}{\underset{|}{C}}H-OH}{\underset{CH_2-\overset{|}{C}H-OH}{\diagup\diagdown}}\underset{CH_3}{}$$

22. An adduct in accordance with claim 16 wherein R is a monovalent polyisobutene radical of a molecular weight of about 1200, said aziridinyl phosphine oxide is tris-1-(2-methylaziridinyl) phosphine oxide, and said end-stopping member is acetic acid.

References Cited

UNITED STATES PATENTS

| | | | |
|---|---|---|---|
| 2,915,480 | 12/1959 | Reeves et al. | 260—239 X |
| 3,184,412 | 5/1965 | Lowe et al. | 252—46.7 |
| 3,185,643 | 5/1965 | Lowe et al. | 252—46.7 X |
| 3,223,681 | 12/1965 | Rambosek | 260—78.4 X |
| 3,225,013 | 12/1965 | Fram | 260—78.4 X |
| 3,231,498 | 1/1966 | De Vries | 252—56 |
| 3,235,497 | 2/1966 | Lee | 252—46.7 |
| 3,268,544 | 8/1966 | Thompson et al. | 260—239 X |

DANIEL E. WYMAN, Primary Examiner

W. CANNON, Assistant Examiner

U.S. Cl. X.R.

252—49.9; 260—78.4, 239